United States Patent [19]

Hergenrother

[11] 4,222,916
[45] Sep. 16, 1980

[54] RUBBERIZED COAL TAR PITCH EMULSION

[75] Inventor: P. Richard Hergenrother, Gibsonia, Pa.

[73] Assignee: Koppers Company, Inc., Pittsburgh, Pa.

[21] Appl. No.: 955,714

[22] Filed: Oct. 30, 1978

[51] Int. Cl.³ .............................................. C08L 91/00
[52] U.S. Cl. ..................... 260/285 AS; 260/28.5 AV; 427/385.5; 428/489
[58] Field of Search ................ 260/28.5 AS, 28.5 AV

[56] References Cited

U.S. PATENT DOCUMENTS

| 3,027,342 | 3/1962 | Kemp et al. | 260/28.5 B |
| 3,356,627 | 12/1967 | Scott | 260/31.2 N |
| 3,366,627 | 1/1968 | Jacob et al. | 536/28 |
| 3,835,117 | 9/1974 | Walaschek | 260/28.5 AS |
| 3,853,606 | 12/1974 | Parkinson | 260/28.5 AS |
| 3,897,380 | 7/1975 | Walaschek | 260/28.5 AS |
| 3,967,651 | 7/1976 | Snyder et al. | 260/28.5 AS |

*Primary Examiner*—Melvyn I. Marquis
*Attorney, Agent, or Firm*—Herbert J. Zeh, Jr.; Oscar B. Brumback

[57] ABSTRACT

A protective coating for bituminous paving surfaces is disclosed, which coating is comprised of a coal tar emulsion, water, and sufficient acrylate emulsion to provide a desired viscosity. Sand may be added to the composition to improve surface traction of coated bituminous surface.

5 Claims, No Drawings

RUBBERIZED COAL TAR PITCH EMULSION

BACKGROUND OF THE INVENTION

A. Field of the Invention

This invention relates to coal tar emulsion compositions for coating bituminous pavement and, more particularly, to the dilution of such compositions with water.

B. Description of the Prior Art

Bituminous surfaces, for example, roads, driveways and the like, are attacked by spilled lubricants and fuels. Aqueous tar emulsions for protecting such surfaces are available from several manufacturers. Normally, tar and water are not compatible. The emulsion of the tar in an aqueous medium, however, may be accomplished with the aid of an emulsifying or dispersing agent such as an organic soap or detergent and/or inorganic colloid such as a particulate clay-like bentonite, or, as U.S. Pat. No. 3,027,342 discloses, by incorporating a copolymer of acrylonitrile and butadiene into a coal tar composition and emulsifying it in an aqueous medium without the aid of an emulsifying agent.

The general requirements for emulsion of such type are set forth in the Federal Specification R-P-355d, "Coal Tar Pitch Emulsion." The chemical requirements are:

|  | Maximum | Minimum |
| --- | --- | --- |
| Water, percent | 53 | — |
| Nonvolatile, percent | — | 47 |
| Ash of nonvalitiles, percent | 40 | 30 |
| Solubility of nonvolatiles in $CS_2$, percent | — | 20 |
| Specific gravity 25° C./25° C. | — | 1.20 |

The physical requirements are that the emulsion is to be homogenous and its components are to show no separation or coagulaton that cannot be overcome by moderate stirring. The emulsion is to be capable of application and complete coverage of a bituminous pavement when applied by squeegee, brush, or other conventional mechanical methods to the surface of the pavement at a spreading rate of 1.5 to 2.5 gallons per 100 square feet in two coats. The tar component of the emulsion is to be a straight run high termperature coke oven tar conforming to requirements of Federal Specification R-T-143. Petroleum tar and oil and water gas tars are not to be used in such coatings even though they comply with R-T-143 because these materials are also attacked by petroleum products such as fuels.

Upon application, the emulsion normally dries in eight hours or less to yield a continuous dry film which protects the bituminous surface from the deteriorating effects of weather, of chemicals used for cleaning and deicing, and of grease, oil and gas spills. Without such protective film, sunlight also has a destructive effect on bituminous pavement, "drying out" or breaking down the binder that holds the stone aggregate together and causing the binding oils to oxidize; the bituminous pavement will become increasingly brittle and eventually shrink and crack. Then, frost damage may occur; water enters through such cracks, expands on freezing and exerts internal pressures to enhance this deterioration. The petroleum derivatives such as fuel oil, gasoline, and lubricating oils, when leaked or spilled, act as solvents and penetrate unprotected asphalt surfaces, thereby causing soft spots and further pavement deterioration. The dry protective film that results from the coal tar emulsion, being black and velvety in appearance, adds an aesthetic value to the pavement while it is providing a tight smooth, non-porous flexible film that resists deteriorating effects of weathering, freeze-thaw, oxidation, jet fuel, gasoline, kerosene and similar petroleum products. Such coal tar emulsions are intended to be used as a protective coat and not as a repair, leveling material or wearing surface, although such coatings generally exhibit excellent wearing properties.

Attempts have been made to vary the general characteristics of such coatings. U.S. Pat. Nos. 3,835,117 and 3,897,380 suggest adding to the emulsion a high amount, 10–20 pounds, of aggregate filler material such as coarse sand to each gallon of emulsion to provide greater strength and durability to the resulting film coatings; but then a special acrylonitrile/butadiene latex must be used to inhibit an undesirable "floating out" or separation of the sand from the film. This special acrylonitrile/butadiene latex is a latex which has an extraordinarily small particle size of between 400 and 1,000 angstroms; conventional acrylonitrile/butadiene latex has a particle size of about 0.25 microns. The special acrylonitrile/butadiene copolymer portion of the special latex is to be present to the extent of 2.5 to 15 percent of the weight of the tar content of the emulsion.

The capability of the special acrylonitrile/butadiene latex to maintain a high quantity of sand in matrix-like suspension even where a higher than ordinary amount of water is employed is, according to U.S. Pat. Nos. 3,835,117 and 3,897,380, theorized to be due to the extraordinarily small acrylonitrile/butadiene particle size. As comparison, the tar particles of the original tar emulsion have a particle size of from about 3–10 microns and the acrylonitrile/butadiene particles of the special latex have a particle size of between 400 and 1000 angstroms. This difference in particle size is believed to permit a distribution of the latex particles throughout a pavement sealing composition so as to provide within the aqueous coal tar emulsion a nearly continuous additional rubber phase which imparts a further thixo-tropic nature to the pavement sealing composition and permits the composition to be applied as and dry to films that are usually 2–10 times thicker than would ordinarily be expected from the conventional tar emulsion compositions.

It is believed, in accordance with this invention and despite the disclosures of U.S. Pat. Nos. 3,835,117 and 3,897,380, that a close relationship does exist between the quantity of sand to be used in the coating and the quantity of coal tar emulsion to be used, and if the amount of sand to be used exceeds this close relationship, then an insufficient amount of the coal tar binder exists to cover the sand and adhere the sand particles to each other and to the bituminous pavement surface. This recommended ratio is from 1 to 6 pounds of clean, coarse, dampened sand per gallon of coal tar emulsion, with the preferred ratio being 2 to 4 pounds of sand per gallon of emulsion. It is also believed that the tar emulsion composition should not be applied to the bituminous pavement surface in a manner as to develop thick coats for the reason that thick coats do not cure readily and often result in pick-up and tracking as persons or vehicles cross the coating, even after the coating has had a reasonable time to cure. If thick final coatings be specified, it is believed the better practice to be that several thin coats of emulsion should be applied to the surface and permitted to dry or cure and subsequent coatings applied thereafter and dried until the final resulting coating of specified size or thickness is reached.

The convenient way to obtain a thin coating is to dilute the composition and apply the composition in the conventional manner. The problem presented, however, is that diluting the tar emulsion with water tends to diminish the thixo-tropic nature and the coating tends to run and the sand to separate. In accordance with this invention, coal tar emulsions to be used as bituminous pavement coatings may be diluted by an amount of water equal to one and one-half times the amount of emulsion and still maintain the same apparent thixotropic nature as if the emulsion had not been diluted. This enables operators to use the same equipment to apply the composition to the surface to a conventional uniform layer on the surface and yet, when the surface dries, it is a uniform thin layer for the surface; a plurality of such layers being more effective than one thick layer.

SUMMARY OF THE INVENTION

In accordance with this invention, it has been found that by adding a minute amount of an aqueous butylacrylate latex to a coal tar emulsion, a volume of water equal to one and one-half times the volume of coal tar emulsion can be added to the coal tar emulsion without a change in the apparent thixotropic nature of the composition or the protective property of the resulting film.

In accordance with the present invention, a butylacrylate emulsion, an emulsion such as described in U.S. Pat. No. 3,356,627, is used. The preferred one of such emulsions has a milky-white liquid appearance, a solids content of 65± 5 percent by weight of the emulsion, a p.h. of 4.8 to 5.4, a specific gravity of 1.04 and a density in pounds per gallon of 8.66. Such an emulsion is a blend of two emulsions; the emulsion being the major component has a large particle size of about ½ micron and the minor component being an emulsion having a particle size of about 1/10 micron, the larger portion being 80–98 percent butylacrylate. Such emulsions are available, for example, from Rohm and Haas under the trademark RHOPLEX.

In preparing the composition according to the invention, the desired volume of water is added to the volume of the coal tar and the two volumes are combined and mixed, and sufficient butylacrylate emulsion is added to adjust the viscosity to the desired thickness or apparent thixo-tropic nature. Thereafter, sand is added to the extent of about 1 to 6 pounds of sand per gallon of original coal tar emulsion. The composition is mixed and then applied to a clean bituminous paving surface in a conventional manner.

DESCRIPTION OF THE PREFERRED EMBODIMENT

To produce the composition of the invention a tank equipped with an agitator is charged a measured volume of the commercially available coal tar emulsion, along with a desired volume of water, then sufficient aqueous butylacrylate blend is added to adjust the composition to the desired viscosity. The measured amount of coarse sand is added and the mixture is agitated until thoroughly blended. The resulting mixture is thixotropic in nature and the sand is held in a matrix-like suspension. The mixture is now ready for spreading on the bituminous surface to leave a coating for the protection of the surface.

One gallon of the composition of this invention will cover from 100 to 125 square feet of bituminous paving with a wet coating that has a thickness of from 16 to 13 mils and that dries to a continuous coating of from 8 to 6.5 mils in thickness.

The following are some typical formulations. In each case, the coal tar emulsion used was that sold by Koppers Company, Inc. as Koppers Regular Pavement Sealer. Such composition conforms to the above Federal Specification R-P-355d. The acrylic composition is that sold by Rohm and Haas as ROPLEX LC-67.

| Example | Parts by Weight | | |
|---|---|---|---|
| | Tar Emulsion | Water | Acrylate Emulsion |
| 1 | 70.6 | 28.9 | 0.5 |
| 2 | 61.5 | 37.8 | 0.7 |
| 3 | 54.4 | 44.6 | 1.0 |

The original coal tar emulsion had a viscosity of 93 Krebbs Units and the viscosity of each of the three examples was 93 Krebbs Units.

To a sample of the original coal tar emulsion composition and to the composition of each of the examples was added three parts by weight of clean coarse sand per 100 parts of composition (the sand being No. 2 silica blast sand or equivalent with size gradation such that 100 percent passes through the 16 sieve size and 5 percent or less passes through the 100 size).

Each of the four compositions was spread on a bituminous surface at the ratio of one gallon of composition per 100 square feet of bituminous surface in each of two coats, with one days' drying time between coats. It was difficult to distinguish one composition from another as to viscosity and ease of application. However, the compositions of the Examples 1–3 seemed to adhere to the bituminous surface even better than the original coal tar emulsion and to have better wear characteristics.

When the compositions are formulated in accordance with this invention, one skilled in the art can readily recognize when the composition has a viscosity that is similar to the viscosity (thickness) with which he is accustomed to work. Less than one-half part of the butylacrylate emulsion for 100 parts of composition (prior to the addition of sand) may not give the desired viscosity and using more than one and one half parts does not seem to provide any economic advantage. Likewise, adding more water to the coal tar emulsion than the one and one-half volume of coal tar emulsion may detract from the adhesion of the film to the bituminous surface and the adhesion of the individual sand particles, and adding less than one-half the volume of water in comparison to the volume of coal tar emulsion does not seem to have any economic advantage. It is recommended that one to six parts of sand be added for 100 parts of the coal tar, water, acrylate emulsion mix; less than one part does not provide any economic advantage and more than six parts may provide a coating that has insufficient adherence of the sand particles.

While the sand used in the Examples above was No. 2 silica blast sand, a sand having smaller or larger particle sizes can be used. The smaller particles give the surface the appearance of a flat non glossy surface. Larger particles of sand can be used but are more difficult to hold in the dry film.

What is claimed:

1. A protective coating composition for bituminous paving surfaces made by mixing coal tar emulsion, water in a volume amount equal to ½ to 1½ the volume of coal tar emulsion, and sufficient butylacrylate emulsion to maintain the composition thixo-tropic.

2. The composition as in claim 1 including from 1-6 pounds of sand per gallon of protective coating compositions.

3. The composition as in claim 1 including from 2-4 pounds of sand per gallon of protective coating composition.

4. A protective coating composition for bituminous surfaces comprising
   (a) a coal tar emulsion;
   (b) from ½ to 1½ parts by volume of water based on the volume of coal tar emulsion;
   (c) a butylacrylate emulsion in an amount sufficient to make the composition thixo-tropic.

5. The composition as in claim 4 including from 1-6 pounds of sand per gallon of protective coating composition.

* * * * *